United States Patent [19]

Higgins

[11] Patent Number: 4,720,137
[45] Date of Patent: Jan. 19, 1988

[54] CURTAIN-HANGING MEANS FOR RECREATIONAL VEHICLES

[75] Inventor: Bob J. Higgins, Elkhart, Ind.

[73] Assignee: Trans-Aire International, Inc., Elkhart, Ind.

[21] Appl. No.: 889,110

[22] Filed: Jul. 22, 1986

[51] Int. Cl.$^4$ .............................................. B60J 1/16
[52] U.S. Cl. ........................... 296/138; 16/94 D; 16/95 D
[58] Field of Search ............ 296/138, 139, 143, 97 G, 296/83, 84 M, 156; 16/94 D, 95 D, 96 D; 160/102, 84 R, DIG. 2, 349 R, 349 D

[56] References Cited

U.S. PATENT DOCUMENTS

| | | | |
|---|---|---|---|
| 1,209,533 | 12/1916 | Abbott | 296/138 X |
| 3,129,751 | 4/1964 | Weber | 16/94 D |
| 3,695,329 | 10/1972 | Roller | 160/84 R |
| 4,230,171 | 10/1980 | Baker, Sr. | 160/84 R |
| 4,282,630 | 8/1981 | Toder | 16/95 D |
| 4,299,008 | 11/1981 | Burns | 16/95 D |
| 4,550,946 | 11/1985 | Hanemaayer | 296/156 |

FOREIGN PATENT DOCUMENTS 398910  3/1966  Switzerland ................ 16/95 D

Primary Examiner—Robert B. Reeves
Assistant Examiner—Carol L. Olson
Attorney, Agent, or Firm—Gordon W. Hueschen

[57] ABSTRACT

There is disclosed curtain hanging tracks made of complementary, extruded members comprising a base portion adapted to be affixed to a wall of a recreational vehicle and a cover portion adapted to be slid onto the base portion and to conceal the fasteners used to mount the base portion on the wall of the recreational vehicle. The cover portion has a longitudinal channel with in-turned lips adapted to receive a T-shaped base of a curtain glide. The curtain is affixed to the glides which in turn are slid into the channel so that the curtain can be adjusted.

1 Claim, 4 Drawing Figures

CURTAIN-HANGING MEANS FOR RECREATIONAL VEHICLES

BACKGROUND OF THE INVENTION

Field of the Invention and Prior Art

The invention relates to improvements in curtain hanging means for recreational vehicles.

It has become common practice to effect conversion of vans into recreational vehicles. For this purpose, curtain hanging means that are simple and easy to install and which are cosmetically acceptable are required. The curtain hanging means for this purpose heretofore available, however, have not been entirely satisfactory. It is an object of the invention, therefore, to provide new and effective curtain-hanging means which are eminently more suitable for use in recreational vehicles than any heretofore available.

SUMMARY OF THE INVENTION

The invention relates to improvements in curtain-hanging means for hanging curtains in front of a window in a recreational vehicle, which comprise:

a two-piece elongate track having complementarily-extruded base and cover portions; and means for mounting said base portion on a wall of the recreational vehicle beneath said window;

said base and cover portions having complementary dovetailing portions whereby said cover portion can be slid onto said base portion after the base portion has been mounted on the wall of the recreational vehicle and a longitudinal channel between said base and cover portions which accommodates means used for mounting said base portion on the wall of the recreational vehicle.

The invention also comprises one or more further features wherein said longitudinal channel comprises a longitudinal recess in said base portion wide enough and deep enough to accommodate the head of a screw used to fasten said base portion to a wall of said recreational vehicle; wherein said base portion has lateral wings and said cover portion has undercut longitudinal grooves adapted to receive said wings; which further comprises glide-holding means in said cover comprising a longitudinal, glide-holding channel having inturned lips and in which a curtain glide having a complementary T-shaped base is adapted to slide to and fro therein; and wherein said base portion has longitudinally-extending, spaced-apart, parallel feet adapted to abut the wall of the recreational vehicle on which the curtain hanger is mounted.

The invention also relates to the improvements described above which further comprises curtain-glide-holding means in said cover portion for slideably holding curtain glides therein and curtain glides slideably mounted in said curtain-glide-holding means, whereby curtains held by said curtain glides can be adjusted longitudinally along said elongate track.

DESCRIPTION OF THE PREFERRED EMBODIMENT

Figure 1:
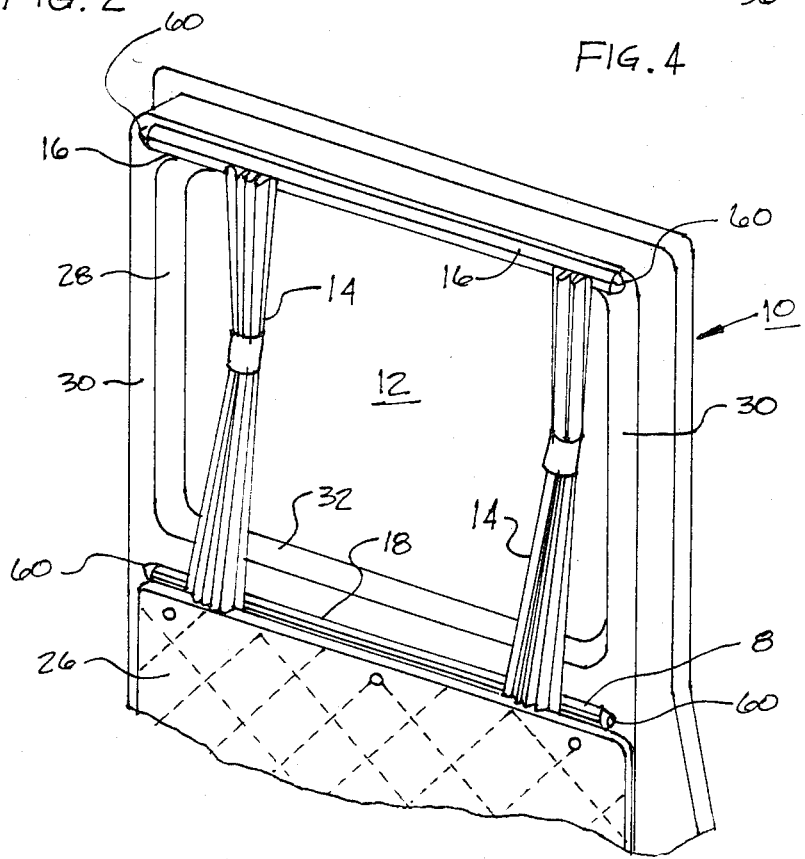
FIG. 1 is a partial view of the interior of a recreational vehicle showing curtains hung by curtain hangers at the top and bottom of the window.

In FIG. 1 there is illustrated a detail of a door 10 of a recreational vehicle having a window 12 therein and curtains 14 hung on an upper hanger 16 and a lower hanger 18.

The door 10 comprises a outer panel 20 and an inner panel 22 and window receptor 24 all of conventional design. The inner panel 22 may, if desired be faced by padding 26, and commonly is dished in as shown at 28 forming an annular rim 30 around the window 12 and a window sill 32.

Figure 3:
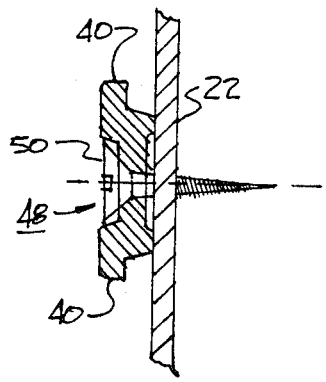
FIG. 3 is a detail view of a track for curtain glides.
Figure 2:
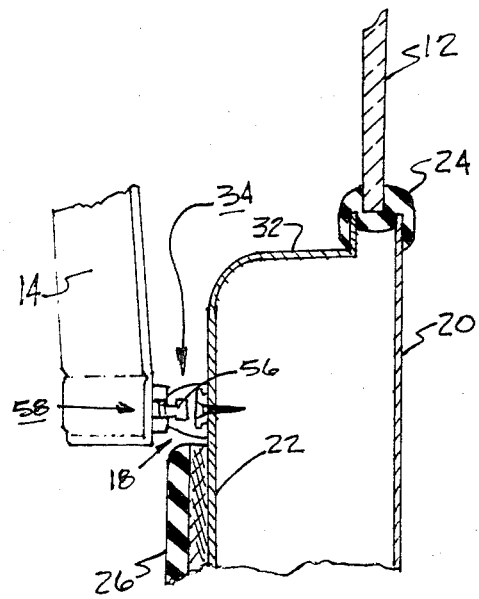
FIG. 2 is a partial transverse section.

Along the top of the window and below the sill 32 are located curtain hangers 16 and 18. Details of the construction of these hangers are shown in FIGS. 2 and 3. Thus, each hanger consists of a two-piece, elongate track 34 made of complementarily-extruded base and cover portions 36 and 38, respectively. More particularly the base portion 36 has a male configuration and the cover portion 38 a female configuration and the two portions dovetail so that the cover portion 36 can be slid on and off the base portion 36 as shown in FIG. 3.

The base portion 36 has two opposed, longitudinal, parallel wings 40 and the cover portion 38 has complementary, undercut, opposed, longitudinal parallel grooves 42 adapted to receive the wings 40. The base portion 36 has spaced longitudinal ribs 44 which are parallel to each other and parallel to the wings 40. The ribs 44 function as feet for abutting the inner panel 22 and for spacing the wings 40 from the inner panel 22 a distance sufficient to allow the cover portion 38 to be slid onto the base portion 36 when it is mounted on the inner panel 22.

Figure 4:
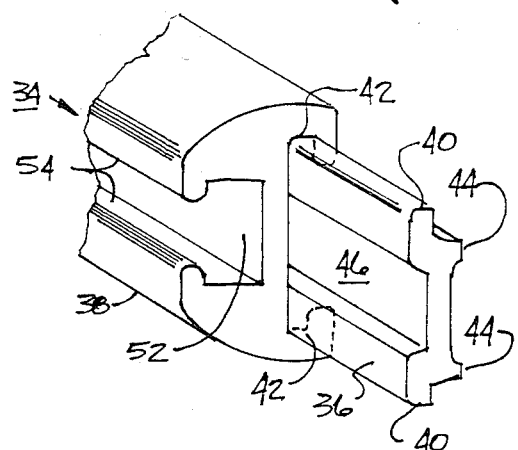
FIG. 4 is an isometric projection.

The base portion 36 has a longitudinal channel or recess 46 in its outer face so that, when a sheet-metal screw 48 is used to mount the base portion 36 on the inner panel 22, as shown in FIG. 4, the head 50 of the screw 48 will be seated in the channel or recess 46 and will not interfere with the sliding of the cover portion 38 onto the base portion 36.

The cover portiom 38 has a longitudinal, glide-holding channel 52 with inturned lips 54 adapted to receive a T-shaped base 56 of a curtain glide 58 so that, when the curtain is affixed to the curtain glide 58 and is in turn slid into the glide-holding channel 52, the curtain can be adjusted as desired.

In use, the base portion 36 is affixed to the inner panel 22 both above and below the window or, if desired, just above the window, by means of sheet metal screws 48, or like fastening means, and then the cover portion 38 is slid into place thus providing upper and lower tracks 16 and 18 with the mounting screws 48 completely hidden. Then the curtain glides 58 are inserted into the glide-receiving channel 52 and the ends of the track capped with end caps 60. The curtains 14 are affixed to the glides 50 to provide a curtained window in which the curtain may be drawn across the window as desired.

While the invention has been illustrated with respect to a window in a door, it is to be understood that it is not so limited and that it can be used with any window in a recreational vehicle. It is also to be understood that the invention is not limited to the particlar modification herein described because various modifications and equivalents will be apparent to one skilled in the art and the invention, acccordingly, is not to be limited except by the full scope of the appended claims.

I claim:

1. In a curtain-hanging means for hanging curtains in front of a window in a recreational vehicle,
the improvement in said curtain-hanging means which comprises:
a two-piece elongate track having complementarily-extruded base and cover portions; and
means for mounting said base portion on a wall of the recreational vehicle adjacent said window;
said base portion having a first longintudinal channel therein wide enough and deep enough to accommodate said mounting means and lateral wings and said cover portion having undercut longitudinal grooves adapted to receive said wings;
said cover portion comprising a longitudinal, glide-holding channel having inturned lips in which a curtain glide having a complementary T-shaped base is adapted to slide to and fro;
said base portion having wall contacting means consisting of a pair of longitudinally-extending, spaced-apart, parallel feet adapted to abut the wall of the recreational vehicle on which the curtain-hanging means is mounted and to form a second longitudinal channel opposed to and separated from said first longitudinal channel by a web having parallel opposed faces which forms the bottoms of said channels.

* * * * *